Sept. 6, 1960 E. R. McCARTER 2,952,006
ATTENUATION OF SEISMIC SIGNALS
Filed May 23, 1956

Ed R. McCarter Inventor
By W. O. Heilman Attorney

2,952,006

ATTENUATION OF SEISMIC SIGNALS

Ed R. McCarter, Tulsa, Okla., assignor, by mesne assignments, to Jersey Production Research Company Filed May 23, 1956, Ser. No. 586,764

2 Claims. (Cl. 340—15)

The present invention broadly relates to a variable resistor which is particularly adapted for use in regulating the amplitude of oscillating electrical signals. The invention especially concerns improved circuit means for variably attenuating the amplitude of seismic signals in the process of their amplification.

It is well known in the art of seismic prospecting to create a seismic disturbance at one point near the earth's surface and to time the arrival of the resulting seismic waves at spaced points from the disturbance by means of suitable seismic detectors or transducers. It is further well known that the signals developed by the detectors are thereafter amplified and recorded to provide a record of information which is helpful in ascertaining the subterranean structure of the earth in the vicinity of the seismic observation.

A very important step in the above procedure of detecting and recording seismic signals is the step in which the signals are amplified sufficiently to actuate a recording device. It is well known that many seismic signals of interest are extremely weak, and considerable amplification of these signals is required in order that they may be satisfactorily and faithfully recorded. Inasmuch as these weak signals are generally accompanied by very strong signals, it has been necessary in the art to develop and employ means for attenuating the stronger signals so as to provide a record in which the stronger signals do not mask the weaker signals or otherwise confuse the record.

While a considerable number of electrical and electronic circuits have been suggested or employed for attenuating amplified seismic signals, substantially all of these circuits have been beset by one or more disadvantages. For example, many of the circuits adequately attenuate a seismic signal but tend to introduce surge voltages into the circuitry which confuse and distort the eventual record obtained. Again, substantially all of the circuits are characterized by requiring relatively large amounts of power and equipment, features which are very undesirable in seismic field equipment where compactness, simplicity and low power consumption are critically necessary. Since it is general practice in field equipment to provide and employ up to 30 or more recording channels in a single recording unit, it will be readily apparent that any additional circuitry in each channel soon culminates in very bulky and very power-consuming equipment.

Accordingly, it is an object of the present invention to provide an improved means for attenuating oscillating signals, and particularly seismic signals which possess frequencies within the range of about 5 to 200 cycles per second. A further object is to provide an improved means for attenuating an amplified seismic signal without introducing surge voltages into the signal. Another object of the invention is to provide an attenuator for an oscillating, variable amplitude signal, wherein the attenuator possesses independently controllable pull-down time and release time characteristics. Still a further object of the invention is to provide a conventional seismic amplifier with an attenuator which possesses size and power characteristics that are greatly reduced with respect to presently available equipment of this type.

These and related objects of the invention will become more apparent with the following description of the invention, especially when this description is read in conjunction with the attached drawing where:

Figure 1:
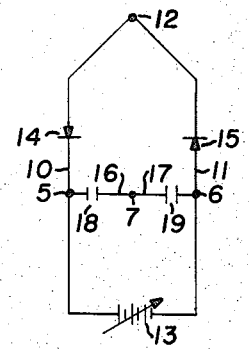
Figure 1 illustrates in schematic form a variable resistor which embodies principles of the present invention.

Referring first to Figure 1, there is illustrated in this figure a variable resistor which may be inserted, either in series or in parallel, within an electric circuit. The resistor consists in combination of two branches 10 and 11 having substantially equal impedances and terminating in two common junction points 7 and 12. Branch 10 includes semi-conductor diode 14 and an additional impedance 18; and branch 11 includes semi-conductor diode 15 and an additional impedance 19. The diodes, it will be observed, are connected in an opposite manner in their respective branches. In other words, the cathode of diode 14 is connected toward the common junction point 12, while the anode of diode 15 is connected to this same junction point.

Also present in the variable resistor of Figure 1 is a source of variable D.C. potential 13 which is connected by suitable wiring or the like within the variable resistor circuit at points 5 and 6. It is essential that the positive side or terminal of the D.C. source be the terminal which is connected to that branch of the variable resistor in which the diode whose cathode is disposed toward the common junction point 12 is located. It is further essential that the potential, which is applied across the junction points 7 and 12 be less than the potential which is required to render the diodes substantially conductive. It is further required that the total impedance between each branch 10 and 11 be substantially identical, and that the additional impedance in each branch—i.e. impedance element 18 or 19—be lower in value than the lowest expected impedance of the diode in each branch.

It will be noted—as indicated earlier in this description—that the variable resistor in Figure 1 may be positioned either in series or in parallel with respect to a given circuit. In many circuits, particularly electronic circuits, it will be further convenient and desirable to connect one of the common junction points 7 or 12 to ground.

The source of variable D.C. potential may be any one of a number of conventional and suitable such sources. Furthermore, the source may be of a type that provides a predetermined variation of potential with respect to time; or it may be one that is adapted to be changed automatically in accordance with the magnitude of an extraneous electrical signal—e.g. the magnitude of the signal in the circuit within which the variable resistor is employed. Furthermore, the D.C. signal may be a signal originating with a D.C. source such as a conventional dry cell connected through a resistor; or it may be an A.C. source wherein an A.C. signal is rectified by means of one or more conventional rectifying elements.

Throughout this description, it will be noted that current flow is assumed to be identical with electron flow; and furthermore, it is assumed in illustrating semiconductor diodes in the figures that the cathode is indicated by an arrow and that the anode is indicated by a bar.

Having briefly enumerated and discussed the nature of the structural components in the variable resistor of Figure 1, attention is now directed toward a brief description of the manner in which this resistor may be employed in an actual application. For the purpose of this description, it will be assumed that the junction points 7 and 12 are connected across opposite leads of an electrical circuit which is passing an oscillating signal. It will further be assumed that the impedances 18 and 19 are selected such that they will pass signals having a frequency range of the oscillating signal, provided the semi-conductors 14 and 15 are rendered conductive. It will additionally be assumed that the D.C. source 13 is variable in its potential and that it is capable of providing a potential sufficient in magnitude to render the semiconductors 14 and 15 conductive to the oscillating signal. It will be recognized at this point that the impedances 18 and 19 may be resistors if so desired, but it is generally preferred that the impedances be capacitors as illustrated.

With these assumptions in mind, it will be recognized that there can be no electron flow in either branch 10 or 11 of the resistor circuit so long as the potential of the source 13 is maintained below the threshold voltage which is required to activate diodes 14 and 15. Once the potential of source 13 has been increased to a value in excess of this threshold value, however, it will further be recognized that electron flow is immediately established through the diodes. In other words, electrons are circulated from the negative side of the source 13 through junction point 6, diode 15, junction point 12, diode 14 and junction point 5 back to the positive side or terminal of the source. Simultaneously, inasmuch as the diodes 14 and 15 are now conductive, electrons flow from junction point 12 to junction point 7—or vice versa—depending upon the sign and magnitude of the oscillating signal in the extraneous circuit into which the variable resistor has been connected.

Figure 2:
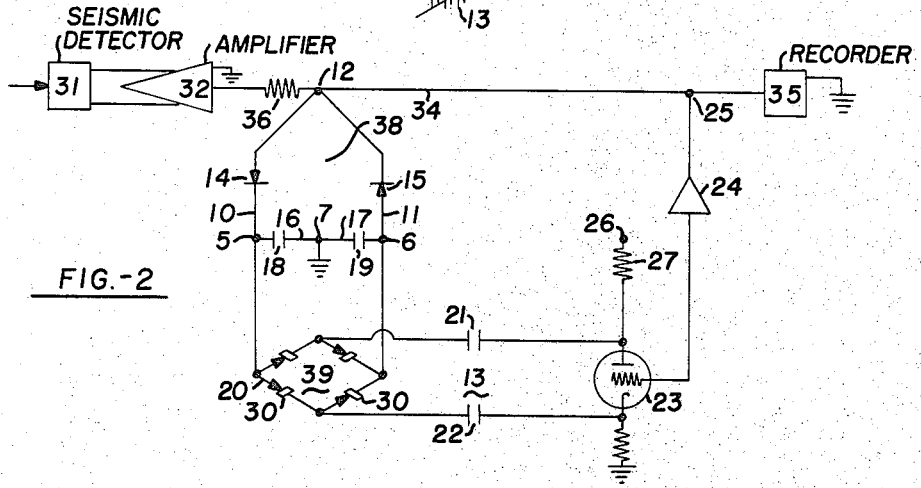
Figure 2 illustrates a preferred embodiment of the invention which an amplified seismic signal may be variably attenuated.

Having indicated in Figure 1 the general nature of the variable resistor of the present invention, attention is now directed to Figure 2 in which there is illustrated a very practical and valuable application of the variable resistor. Referring specifically to Figure 2, it will be seen that the apparatus illustrated there includes a seismic detector 31, an amplifier 32, electrical lead 34, a recorder 35, variable resistor 38, rectifier bridge 39, triode 23, amplifier 24 and resistor 36. It will be recognized that other conventional components of seismic recording systems may be employed such as filters, modulators, demodulators, etc.; but in view of their known characteristics it is felt that a detailed discussion of these additional components in Figure 2 is unnecessary insofar as the present discussion is concerned.

In considering the various components that are illustrated in Figure 2, it will be recognized that seismic detector 31 may be a conventional seismic transducer, geophone, or the like. It will also be recognized that variable resistor 38 is in essence the same variable resistor as presented and discussed in Figure 1. The identical numerals have been employed in both of these figures, as well as in Figure 3, to depict identical elements. Thus, it will be seen that variable resistor 38 includes two semi-conductor diodes 14 and 15, two matched impedances 18 and 19, two branches 10 and 11, two common junction points 7 and 12, and a source of variable D.C. potential 13. And in connection with source 13 it will be particularly observed that this source includes a combination of triode 23, capacitors 21 and 22 and rectifying bridge 39. It will further be seen that the grid of triode 23 is connected through amplifier 24 and junction point 25 to the electrical lead which transmits a seismic signal from junction point 12 to recorder 35.

Resistor 36 is connected in series with each one of the variable resistor circuits branches 10 and 11 and is of a value so as to provide a potential at point 12 relative to point 7 which is incapable of rendering diodes 14 and 15 conductive. Normally speaking, the impedance value of resistor 36 will be at least about 2000 to 3000 times greater than the impedance of either branch 10 or 11 when the diodes 14 and 15 have reached their lowest contemplated impedance values.

Inasmuch as seismic signals generally possess frequencies within the range from about 5 to 200 cycles per second, it is essential that impedances (preferably capacitors) 18 and 19 possess characteristics which enable them to pass frequencies of this magnitude. With further respect to capacitors 18 and 19 it is desirable that these elements have impedance values of the diodes 14 and 15.

With respect to diodes 14 and 15, it is to be noted that these elements should have substantially infinite impedance values at zero applied voltage in seismic amplifying circuits such as the one illustrated in Figure 2. Indeed, it is preferred that these diodes be silicon diodes inasmuch as silicon diodes have been found to possess marked superiority over other semi-conductor diodes in applications of this type. Further, when employing silicon diodes in the manner discussed, it is necessary that the voltage applied across the diodes—i.e. between junction points 12 and 7—be maintained no greater than about 50 millivolts and preferably less than 20 millivolts.

As indicated earlier, the variable source of D.C. potential in the apparatus of Figure 2 consists of a triode 23 in combination with a rectifying bridge circuit 39. The plate of triode 23 is connected through resistor 27 to the positive side of a source of D.C. potential, and the cathode is conveniently connected to ground. The grid of the triode is connected through amplifier 24 to the signal which is transmitted to recorder 35. Furthermore, the plate and cathode of triode 23 are connected through condensers 21 and 22 to a pair of opposite terminals of the rectifier bridge 39. The other pair of opposite terminals of the bridge in turn are connected to junction points 5 and 6 of the variable resistor 38. Thus, a sample of output signal in lead 34 which is transmitted to recorder 35 continuously controls the amount of electron flow through triode 23. Triode 23, in turn, then supplies an electrical signal to the rectifier bridge 39 which is continuously related in magnitude to the magnitude of the seismic signal being supplied to recorder 35.

Each lead 20 of the bridge 39 includes a rectifying element 30, all of these elements being arranged and adapted so as to apply a D.C.-type signal to junction points 5 and 6 of variable resistor 38 in the same manner as stated in connection with the apparatus of Figure 1. Thus, the amount of D.C. potential applied to variable resistor 38 is directly related to the amplitude of the seismic signal in line 34; and the loss of seismic signal from line 34 through the variable resistor to junction point 7 is continuously related to the amplitude of the seismic signal. Automatic and variable attenuation of the seismic signal flowing to the recorder 35 is therefore possible.

At this point it should be noted that the rectifying elements 30 in the bridge network 39 may be vacuum-tube diodes or other conventional rectifiers, but it is far preferable in seismic amplification circuits to employ semi-conductor diodes for this purpose. Their small physical size, their stability and their low power consumption make them uniquely valuable in such installations.

While the rectifier bridge 39 in Figure 2 is a full wave type of rectifier bridge, it will be recognized that a half wave rectifier may also be employed although less preferred. Especially desirable rectifier elements are silicon diodes and selenium diodes, since both of these types of diodes have substantially infinite impedance at zero supplied voltage.

Figure 3:
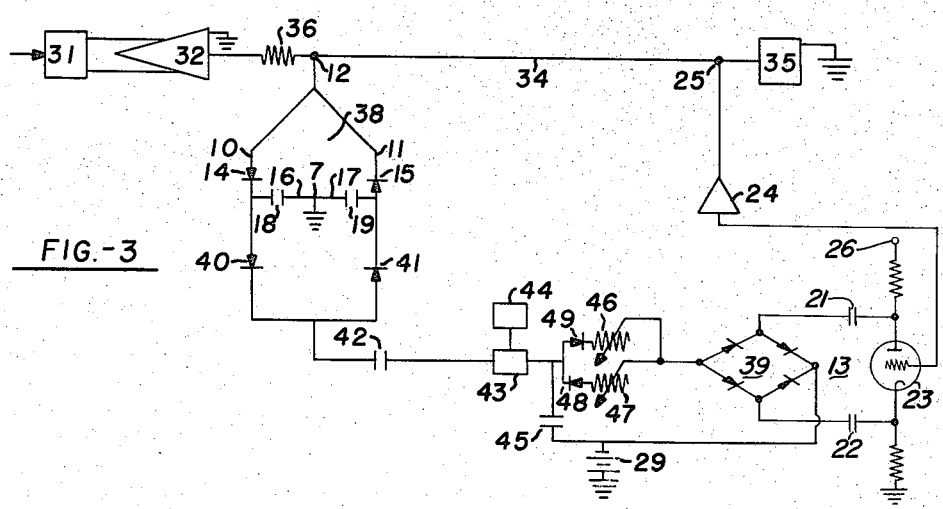
Figure 3 illustrates a preferred embodiment of the invention in the form of a variable attenuator which possesses independently controllable pulldown and release time characteristics and which is capable of automatically and continuously attenuating an oscillating signal.

Referring next to Figure 3, it will be readily seen that the system illustrated in this figure incorporates many of the same components and principles that are illustrated in Figures 1 and 2. The system in Figure 3, however, is further characterized by possessing circuit means which provides for independent control of the release and pull-down time periods of the system depicted therein.

In comparing Figure 3 with Figures 1 and 2, it will be seen that Figure 3 contains the same type of variable resistor as is presented in the former figures. Furthermore, the system in Figure 3 contains a seismic detector 31, an amplifier 32, a fixed resistor 36, a recorder 35, and an amplifier 24 in the same manner as the system of Figure 2. The system in Figure 3 also includes a source of variable D.C. potential 28, a source of fixed D.C. potential 29, variable resistors 46 and 47, rectifiers 48 and 49, capacitances 42 and 45, electronic gate 43, a source of high frequency signal 44, and rectifiers 40 and 41.

In the absence of a significant signal from D.C. source 28, the magnitude of the negative potential exerted by source 29 is adjusted such that electronic gate 43 blocks any signal from source 44. It will be apparent that a triode or other suitable electronic means may be readily employed as the electronic gate 43. It will further be recognized that any conventional rectifying elements such as vacuum tube diodes, or the like may be employed as the rectifying elements 40, 41, 48 and 49. It is much preferred, however, that semi-conductor diodes of the types described earlier herein be employed in these positions in view of their compactness, low power requirements, great stability, etc.

As stated above, source 28 in the system of Figure 3 is a variable source of D.C. potential, the magnitude of the potential being related to the magnitude of the signal flowing in lead 34. A device suitable for use as such a source may be similar to the source 13 illustrated in Figure 2. Other suitable sources will be readily apparent to persons skilled in the art.

It will further be observed in Figure 3 that source 28 is inserted in the system so as to oppose the potential normally exerted by the source 29. Furthermore, variable resistors 46 and 47 are connected in the external circuit of source 28 in combination with rectifiers 48 and 49 and capacitance 45 such that variable or adjustable release and pull-down attenuation periods are provided for the signal traveling between amplifier 32 and recorder 35. This feature of the illustrated system will be brought out in more detail a little later in this description.

It will be apparent that capacitance 42 serves to isolate the variable resistor 38 in Figure 3 from the electronic gate 43 and the other components that are positioned between the electronic gate and junction point 25. It will furthermore be apparent that the rectifiers 40 and 41 serve to supply a rectified D.C. signal to the variable resistor 38 rather than an oscillating signal such as emanates from capacitance 42.

Considering for the moment that a signal of rapidly increasing amplitude flows through lead 34 from amplifier 32 to recorder 35, it will be apparent that the sampled signal at junction point 25 causes an increase in the amplitude of the D.C. signal produced by source 28. It will be further apparent that with an increase in this signal a time delay between the occurrence of the amplified signal at source 28 and at the gate 43 is occasioned by the presence of capacitance 45 in combination with resistor 46. It will additionally be apparent that the adjustable nature of this resistor makes it possible to readily control the degree of time delay, therefore further making it possible to control the pull-down time or effective attenuation time of the signal in line 34.

With the advent of a more positive potential at the gate 43, a high frequency signal, which is variable in amplitude depending upon each instantaneous value or magnitude of the signal from source 28, is supplied to capacitor 42. Similarly, a signal—opposite in sign but proportional in magnitude—is supplied from capacitor 42 to the variable resistor 38, this signal being rectified by the action of the rectifying elements 40 and 41. The action of the variable resistor 38, being identical with the action of the similar resistors in Figures 1 and 2, causes a portion of the signal in line 34 to be transmitted to the ground connection 7 with the result that the signal in line 34 is attenuated as desired.

Having pointed out how the amplitude of the signal in line 34 may be attenuated in the event of a rapidly increasing signal, it will be readily recognized that an opposite effect may be readily attenuated in the event of a rapidly decreasing signal. In the latter instance, the other adjustable resistor 47 becomes instrumental in determining the time period during which an attenuation effect is produced.

The value of the variable or adjustable pull-down and release characteristics of the system in Figure 3 will be readily apparent to persons skilled in the art. It has long been recognized that presently conventional circuit means for attenuating amplified seismic signals are possessed or characterized by pull-down and release times of different values. It has further been recognized that it is frequently desirable to change these characteristics of an attenuation circuit directly during the period of a seismic observation. The achievement of such desirable features is now made feasible and practical by means of the circuit illustrated in Figure 3.

Having described and illustrated particular embodiments of the present invention, it will be recognized that numerous modifications and variations may be practiced without departing from the spirit or scope of the present invention. For example, it will be recognized that the invention has particular application in multi-channel seismic systems wherein the compact and efficient nature of the invention provides a uniquely valuable and desirable system of handling seismic information. It will further be recognized that the system has application to various types of seismic detectors as well as to various types of modulation techniques, amplifying techniques, filtering systems, and the like. It will additionally be recognized that a great variety of conventional electrical and electronic components may be used in place of or in addition to the components that are illustrated in the figures.

What is claimed is:

1. In a system for detecting and recording seismic signals including a seismic detector, recording means, and electrical circuit means connecting said detector and said recorder, the improvement which comprises in combination resistance means and variable D.C. source means in parallel with said electrical circuit means, said resistance means comprising a balanced 2-branch circuit, a silicon diode in each branch adapted to conduct electrical signals in opposite directions, one end of each branch connected to said electrical circuit means, the opposite end of each branch connected through a separate impedance to a common junction, said variable D.C. source means comprising a variable D.C. source whose output is responsive to the amplitude of signals passing through said electrical circuit means, resistance-capacitance means connecting said D.C. source to each branch of said resistance means between the diode and the impedance, the resistance component of said resistance-capacitance means being a 2-branched circuit with a variable resistor and a rectifier in each branch adapted to pass electrical signals in opposite directions.

2. In a seismograph system comprising a seismic detector, a recorder, and electrical circuit means connecting said detector to said recorder, the improvement which comprises a bridge element and variable D.C. source means connected in series with one another and shunted across said electrical circuit means, said bridge element comprising a pair of impedances and a pair of silicon diodes, a separate terminal connected to said bridge element at a point between each diode and its adjacent impedance, said D.C. source means comprising a variable D.C. source whose output varies as the amplitude of the signal in the said electrical circuit means, a resistance-capacitance circuit connecting said source to the terminals of said bridge element, the resistance component of said resistance-capacitance means being a two-branched circuit, each branch of said circuit having a variable resistor and a rectifier connected in series and arranged to pass signals in opposite directions within the two branches.

References Cited in the file of this patent

UNITED STATES PATENTS

| | | |
|---|---|---|
| 2,003,428 | Cowan | June 4, 1935 |
| 2,098,370 | Bartels | Nov. 9, 1937 |
| 2,173,925 | Tuxen | Sept. 26, 1939 |
| 2,312,642 | Herzenberg | Mar. 2, 1943 |
| 2,329,558 | Scherbatskoy | Sept. 14, 1943 |
| 2,342,238 | Barney | Feb. 22, 1944 |
| 2,546,371 | Peterson | Mar. 27, 1951 |
| 2,554,905 | Hawkins | May 29, 1951 |